United States Patent
Kobayashi et al.

(10) Patent No.: US 7,968,174 B2
(45) Date of Patent: *Jun. 28, 2011

(54) DECORATIVE MATERIAL HAVING LOW-GLOSS PATTERN INK LAYER FORMED ON PART OF A SUBSTRATE AND A SURFACE PROTECTIVE LAYER ON THE PATTERN IN K LAYER, AND DECORATIVE PLATE INCLUDING SUCH MATERIAL

(75) Inventors: Toshitake Kobayashi, Saitama (JP); Eiichiro Yokochi, Saitama (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/576,155

(22) PCT Filed: Sep. 29, 2005

(86) PCT No.: PCT/JP2005/017969
§ 371 (c)(1),
(2), (4) Date: Mar. 28, 2007

(87) PCT Pub. No.: WO2006/035880
PCT Pub. Date: Apr. 6, 2006

(65) Prior Publication Data
US 2008/0070005 A1 Mar. 20, 2008

(30) Foreign Application Priority Data
Sep. 30, 2004 (JP) .................................. 2004-287829

(51) Int. Cl.
*B41M 5/00* (2006.01)

(52) U.S. Cl. .................... 428/195.1; 428/196; 428/197; 428/156; 428/423.1; 156/196; 526/279

(58) Field of Classification Search .............. 428/195.1, 428/196, 194, 197, 156, 423.1; 156/196; 526/279
See application file for complete search history.

(56) References Cited

U.S. PATENT DOCUMENTS

| | | | | |
|---|---|---|---|---|
| 4,196,033 | A | * | 4/1980 | Arai et al. ..................... 156/196 |
| 4,490,410 | A | * | 12/1984 | Takiyama et al. ............. 427/504 |
| 4,855,184 | A | * | 8/1989 | Klun et al. .................. 428/425.1 |
| 5,266,397 | A | * | 11/1993 | Ogawa et al. ................. 428/323 |

(Continued)

FOREIGN PATENT DOCUMENTS

JP 51-26937 3/1976
(Continued)

*Primary Examiner* — Bruce H. Hess
*Assistant Examiner* — Tamra L Amakwe
(74) *Attorney, Agent, or Firm* — Antonelli, Terry, Stout & Kraus, LLP.

(57) ABSTRACT

A decorative material having a pattern on a surface thereof and exhibiting a difference in gloss according to the pattern which is visually recognized as a concave portion, the decorative material further exhibiting not only a good surface strength such as abrasion resistance but also good marring resistance and oil resistance. The decorative material includes at least a substrate, a low-gloss pattern ink layer formed on part of the substrate, and a surface protective layer which is present on and contacted with the low-gloss pattern ink layer so as to cover a whole surface including both a region where the low-gloss pattern ink layer is formed and a region where no low-gloss pattern ink layer is formed.

15 Claims, 4 Drawing Sheets

U.S. PATENT DOCUMENTS

| | | | |
|---|---|---|---|
| 5,296,340 A * | 3/1994 | Tsukada et al. | 430/394 |
| 6,110,316 A * | 8/2000 | Kobayashi et al. | 156/230 |
| 6,306,947 B1 * | 10/2001 | Morishima et al. | 524/457 |
| 6,326,074 B1 * | 12/2001 | Takahashi | 428/156 |
| 6,514,624 B2 * | 2/2003 | Takemoto | 428/447 |
| 6,558,799 B2 * | 5/2003 | Takeuchi et al. | 428/423.1 |
| 6,852,399 B2 * | 2/2005 | Takahashi et al. | 428/213 |
| 2005/0129970 A1 | 6/2005 | Yokochi | |

FOREIGN PATENT DOCUMENTS

| | | |
|---|---|---|
| JP | 51-33454 | 3/1976 |
| JP | 51-84910 | 7/1976 |
| JP | 63-050066 | 3/1988 |
| JP | 64-041505 | 2/1989 |
| JP | 2001-199028 | 7/2001 |
| JP | 2005-313411 * | 11/2005 |
| WO | WO 03/078161 A1 | 9/2003 |

* cited by examiner

DECORATIVE MATERIAL HAVING LOW-GLOSS PATTERN INK LAYER FORMED ON PART OF A SUBSTRATE AND A SURFACE PROTECTIVE LAYER ON THE PATTERN IN K LAYER, AND DECORATIVE PLATE INCLUDING SUCH MATERIAL

TECHNICAL FIELD

The present invention relates to decorative materials provided on a surface thereof with a pattern which have a visual convexo-concave feeling due to a difference in gloss according to the pattern, are excellent in durability of the surface including the pattern, and exhibit not only a surface strength such as abrasion resistance but also a marring resistance and an oil resistance.

BACKGROUND ART

Surface decorative plates used for furniture or cabinets of kitchen wares generally have such a laminated structure in which a decorative sheet having, for example, a printed woodgrain pattern thereon is bonded onto a wood material, an inorganic material, a synthetic resin-based material, a metallic material such as steel plate, etc., through an adhesive.

The decorative sheet used for the surface decorative plates has been required to exhibit various properties, e.g., adequate processing suitability such as flexibility, cuttability and breaking resistance for secondary processing such as laminating, wrapping and V-cutting, as well as weather resistance, light resistance, heat resistance, water resistance, solvent resistance, surface hardness, abrasion resistance, marring resistance, etc., upon use.

To meet these requirements for the decorative sheet, there has been used a substrate fully satisfying the above processing suitability which is provided on a surface thereof with a surface protective layer. The suitable surface protective layer conventionally used has been made of an ionizing radiation-curable resin composition. The ionizing radiation-curable resin composition is cured when exposed to an ionizing radiation such as ultraviolet ray and electron beam. The use of such an ionizing radiation-curable resin composition have various advantages such as solvent-free and environment-favorable formation of the surface protective coating layer without using an organic solvent, easy achievement of a good surface strength such as abrasion resistance owing to a high crosslinking density thereof, etc.

Meanwhile, with the recent tendency of consumers toward high-grade products, floor tiles and wall panels as well as furniture and cabinets of kitchen wares have been required to show a high-grade feeling. The decorative plates and decorative sheets used in these products have also been demanded to exhibit a good appearance with a high-grade feeling. For this reason, it becomes important to impart a good texture to these products by printing various patterns on a surface of a substrate sheet, or laminating a film with a pattern layer thereon, and there have been proposed various methods such as the method of delustering specific portions of the patterns or forming convex and concave patterns on such portions to impart a good texture thereto.

For example, there has been proposed the method in which surface regions which are different in wettability to an electron beam-curable coating material or a photocurable coating material from each other are formed on a substrate by providing a patterned coating layer on the substrate, and then the electron beam-curable coating material or the photocurable coating material is applied onto the substrate to recess a surface of the applied coating material in the surface region having a good wettability to the coating material and raise a surface of the applied coating material in the surface region having a poor wettability to the coating material (for example, refer to claims of Japanese Patent Publication No. 26937/1976). However, the above method has such a problem that when the concave portions, i.e., the surface region having a good wettability to the coating material is narrow, neat convexo-concave patterns are unattainable thereon. Further, although the existence of concave portions which are thick to some extent allows formation of convexo-concave patterns on the surface of the substrate, an end portion at which transition from the convex portion to the concave portion or vice versa occurs, is rounded at a boundary region between the recessed and raised portions due to a surface tension of the coating material, etc. As a result, there tend to arise problems such as lacking of sharpness of the convexo-concave patterns and formation of convex portions having a larger height than that of the raised portions, which results in lacking of reality, for example, in the case of woodgrain patterns, and poor appearance and touch feeling.

There has also been proposed the method in which a film on which a multicolor pattern is printed with an ink containing a curing retarder for retarding curing of resins in a solvent-free coating material and an ink containing no curing retarder is laminated on a resin coating layer formed by previously applying the solvent-free coating material on a substrate, the resin is cured in a curing atmosphere, and then the film is peeled off from the substrate to transfer the multicolor pattern onto the substrate (refer to claims of Japanese Patent Publication No. 33454/1976). According to this method, only the color pattern portion printed with the ink containing a curing retarder can be transferred and recessed. However, the above method not only requires use of the special inks, but also has such a problem that a curing reaction of the resin coating layer produced from the solvent-free coating material is unstable.

Further, there has been proposed the decorative material composed of two kinds of pattern layers successively formed on a substrate, i.e., a pattern layer made of an ordinary ink and a convex pattern layer made of an electron beam-curable composition, and a transparent resin layer formed on the pattern layers, in which after coating, the convex pattern layer is cured by irradiating an electron beam thereto through the transparent resin layer (refer to claims of Japanese Patent Publication No. 41505/1989). However, the decorative material has physically large convexo-concave portions and therefore tends to suffer from flaws or scratches in the convex portions. This tendency is more remarkable in the case where the convex portions have a larger surface area. Also, in this method, when it is intended to obtain a contrast of gloss such as, for example, woodgrain patterns, namely form a pattern having convex portions as a large part and very narrow concave portions between the convex portions like vessel grooves of woodgrain, there tends to arise such a problem that the concave portions are buried due to flowing of the coating material for forming the transparent resin layer, and the extent of burying of the concave portions becomes inadequately uneven, and further such physical convexo-concave portions cause a poor touch feeling.

In addition, there has been proposed the decorative paper with a woodgrain pattern which is produced by solid-printing a wooden undercoating color on a thin paper with an ultraviolet-curable printing ink containing a delustering agent, irradiating an activation light ray to the resultant undercoat, printing a woodgrain pattern on the undercoat with a high-gloss ultraviolet-curable printing ink, and then irradiating an activation light ray to the thus printed woodgrain pattern (refer to claims of Japanese Patent Application Laid-Open No. 84910/1976). In the decorative paper, portions printed with the high-gloss ink appear like convex portions, whereas portions printed with the ink containing the delustering agent appear like concave portions, thereby imparting a woody texture to the decorative paper. However, since the thus proposed decorative paper is provided with no transparent topcoat as a protective coating film, portions corresponding to the so-called vessel-printing ink used for printing a woodgrain pattern are deteriorated in weather resistance, water resistance, abrasion resistance, marring resistance, etc., namely, shows a poor durability.

Further, there has been proposed the method for producing convexo-concave patterns by forming a pattern made of an ionizing radiation-shielding material on either a front or back surface of an ionizing radiation-penetrating release substrate having a surface releasability, laminating a convexo-concave pattern-forming substrate having a layer made of an uncured ionizing radiation-curable resin on a surface thereof on the release substrate, irradiating an ionizing radiation to the resultant laminate from a side of the release substrate to cure only the ionizing radiation-curable resin located corresponding to non-patterned portions made of the ionizing radiation-shielding material, and then removing the uncured resin in the ionizing radiation-curable resin layer together with the release substrate (refer to claim 8 of Japanese Patent Application Laid-open No. 253449/1989). According to the method of this invention, in the patterned portions made of the ionizing radiation-shielding material, the ionizing radiation-curable resin is kept uncured and attached to the release substrate, and removed together with the release substrate, whereas in the non-patterned portions made of the ionizing radiation-shielding material, the ionizing radiation-curable resin remains in a cured state on the substrate so that the convexo-concave patterns coordinated with aimed patterns are formed on the substrate. However, this method has disadvantages such as need of special materials such as the release material and the ionizing radiation-shielding material. Further, in the above method, since the uncured resin is attached to the release substrate and removed together therewith, there tend to occur problems such as failure of forming deep and sharp concave portions. In addition, in the case where an electron beam-curable resin is used as the ionizing radiation-curable resin, it is difficult to select a suitable electron-beam-shielding material.

Also, there has been proposed the method for producing a decorative plate with convexo-concave patterns by applying a radiation-polymerizable synthetic resin onto a printed or decorative paper-laminated substrate, irradiating a radiation onto the obtained synthetic resin layer until the synthetic resin reaches a semi-cured state, pressing the semi-cured layer using a cold pressing member such as a roll press with corresponding convexo-concave patterns, and then completely curing the synthetic resin (for example, refer to claims of Japanese Patent Publication No. 28264/1974). However, it is difficult to determine the specific conditions for keeping the resin in a suitable and stable semi-cured state, and the semi-cured synthetic resin is unstable. Further, this method has problems such as need of the complicated two-stage curing procedure.

In consequence, there has also been proposed the method for continuously forming convexo-concave patterns by applying an electron beam-curable resin on a substrate using a coating apparatus, and irradiating an electron beam to the applied electron-beam-curable resin while contacting the resin with a molding roll with corresponding convexo-concave patterns within an electron-beam irradiating apparatus to impart the convexo-concave patterns of the molding roll to the cured resin (for example, refer to claims and FIG. 1 of Japanese Patent Publication No. 50066/1988). However, this method has such an inconvenience that not an ordinary printing apparatus but the special molding roll apparatus is required to form the convexo-concave patterns, and the molding roll has only a limited pattern-forming speed, resulting in poor yield.

Further, there has been proposed the decorative material which is successively provided on a surface of a substrate with a coating film layer, a pattern layer and a surface protective layer made of a crosslinked and cured ionizing radiation-curable resin composition in which the pattern layer exhibits a higher penetrability to the ionizing radiation-curable resin composition than that of the coating film layer (for example, refer to claims and FIGS. 1 and 2 of Japanese Patent Application Laid-open No. 199028/2001). In the decorative material, since the ionizing radiation-curable resin composition tends to be readily penetrated into portions where the patterns are present, the portions to which the ionizing radiation-curable resin composition is penetrated are formed into concave portions, thereby obtaining a decorative material having convexo-concave patterns on a surface thereof. However, in the decorative material, it is required to add a large amount of an extender pigment or a porous material to the pattern layer in order to impart a sufficient absorptivity and penetrability to the pattern layer. In this case, since the pattern layer has a porous structure and therefore tends to become brittle, the resultant convex portions of the decorative material tend to be deteriorated in durability and stain resistance. On the other hand, when it is intended to inhibit the pattern layer from being formed into a porous structure in order to enhance a durability and a stain resistance of the convex portions, there arises such a problem that the convex portions are insufficient in depth and sharpness. Further, the decorative material have physical convexo-concave portions and therefore exhibit a poor touch feeling which must be further improved.

Further, in the case where the decorative material is used in shelves of a kitchen cabinet, etc., even though its surface protective layer is made of a crosslinked and cured product of the ionizing radiation-curable resin, edible oils attached onto the surface of the decorative material tend to penetrate to an inside thereof, resulting in increase in transparency at the oil-penetrated portions and, therefore, causing the portions to remain with a water-wetted appearance, i.e., a so-called wet color.

As a matter of course, if the thickness of the surface protective layer is increased to several tens μm, the surface protective layer forms a dense layer, thereby preventing the oils from penetrating underneath the surface protective layer and inhibiting the wet color from occurring thereon. However, when the surface protective layer having a large thickness is made of the ionizing radiation-curable resin which tends to form a harder layer than thermosetting resins, the resultant decorative material tends to be deteriorated in flexibility and become difficult to store in the form of a roll, and further the costs of materials therefor tend to be increased. Therefore, in view of the storage and costs, the thickness of the surface protective layer is usually 10 μm or less and preferably as small as possible, as long as the layer can maintain a suitable performance. On the other hand, as the thickness of the surface protective layer is reduced, influence of a coating solution penetrating into the substrate tends to become more considerable upon forming the surface protective layer. As a result, a denseness of the surface protective layer is lowered and voids formed therein are increased, so that oils attached onto the surface of the decorative material tend to more readily penetrate thereinto, thereby exhibiting a wet color.

In the case where the substrate itself is previously impregnated with a resin, even though the surface protective layer itself is slightly deteriorated in oil resistance to allow oils attached onto the surface of the decorative material to penetrate into the surface protective layer, the oils are inhibited from further penetrating into the resin-impregnated substrate. However, the problem that the surface protective layer itself has a poor oil resistance still remain unsolved. In addition to the above problem, a costly expensive resin-impregnated product is required as the substrate, and such a substrate tends to be deteriorated in flexibility.

In addition to the oil resistance, a marring resistance is also an important factor for the decorative material. The marring resistance is an anti-scratch property required for the decorative material separately from the oil resistance even when the decorative material exhibits a sufficient surface strength, for example, a high abrasion resistance by forming the surface protective layer from a crosslinked cured product of the ionizing radiation-curable resin. For the purpose of attaining a good abrasion resistance, the surface protective layer is usually hardened by adding a filler such as silica particles thereto. However, in particular, when adjusting a surface gloss of the decorative material by the surface protective layer for design expression thereof, the surface gloss tends to be undesirably increased owing to gathering of very fine scratches formed thereon. For example, when a number of decorative plates stuck together undergo swing or vibration motions and are rubbed with each other upon transportation thereof, or when handling the decorative plates in a production line thereof, the increase in surface gloss due to the gathered scratches tend to occur. Although such a condition that fine scratches are uniformly distributed over a surface of the decorative plate will be still suitable, when a part of the surface of the decorative plate undergoes repeated rubbing motions, spot-like difference in gloss on the surface tends to become remarkable, resulting in production of defective products. For this reason, the decorative material is required to have good a marring resistance capable of preventing occurrence of change in gloss even when the surface thereof is exposed to the rubbing motions.

BRIEF EXPLANATION OF REFERENCE NUMERALS

Figure 1:
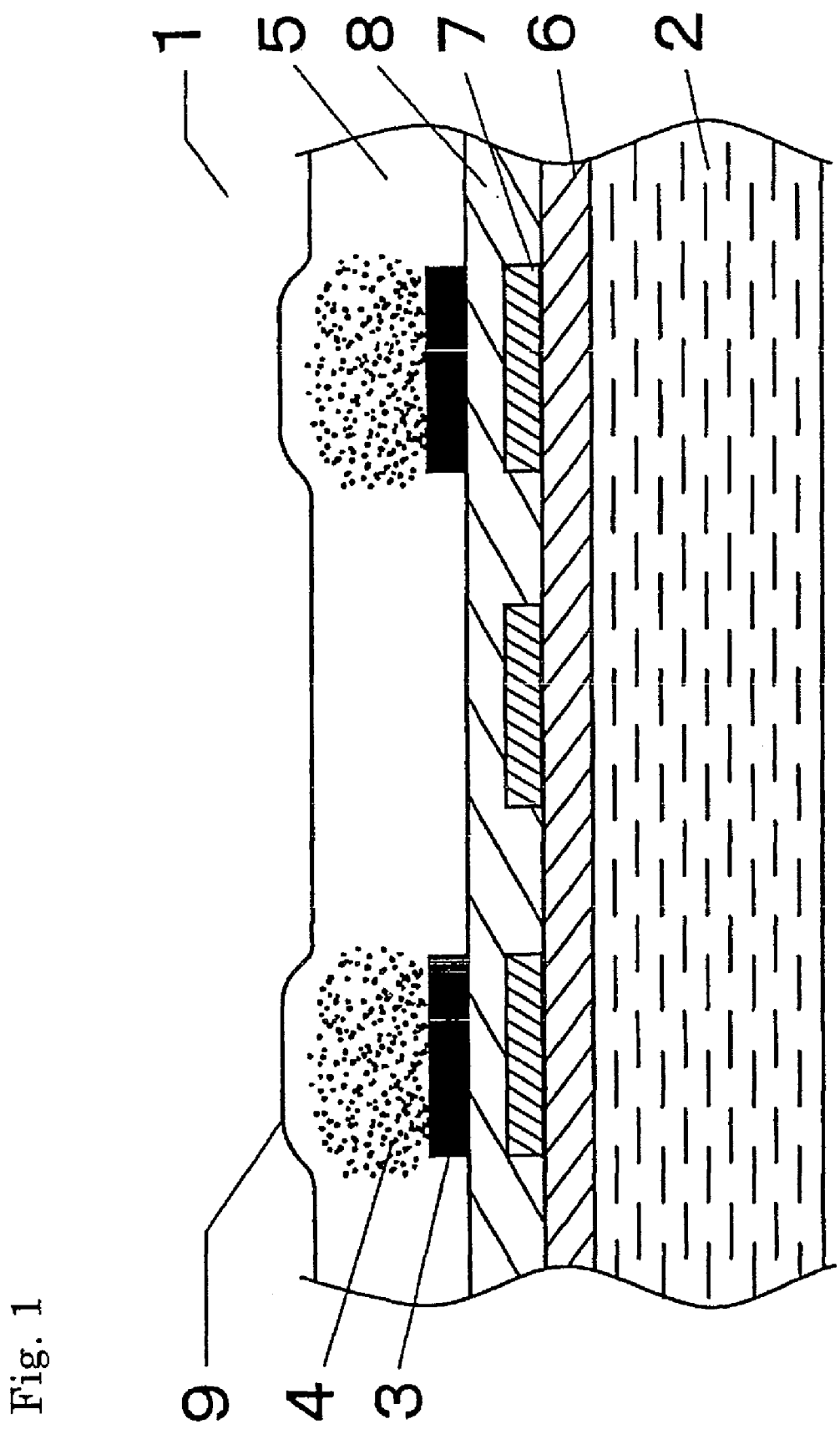
FIG. 1 is a schematic view showing a section of a decorative material according to the present invention.

1: Decorative material; 2: Substrate; 3: Low-gloss pattern ink layer; 4: Low-gloss region; 5: Surface protective layer; 6: Colored layer; 7: Pattern layer; 8: Penetration-preventing layer; 9: Convex shape; 10: Adhesive layer; 11: Support

SPECIFICATION OF THE INVENTION

Problems to be Solved by the Invention

The present invention has been made in view of the above conventional problems. An object of the present invention is to provide a decorative material having a pattern on a surface thereof and exhibiting a difference in gloss according to the pattern which is visually recognized as a concave portion, thereby imparting a convexo-concave feeling to the surface thereof, and further having good solvent resistance and abrasion resistance, and a high interlaminar strength, as well as a less change in appearance even when stained with oils and excellent oil resistance and marring resistance.

Means for Solving the Problems

As a result of intensive and extensive researches to achieve the above object, the inventors have found that the above problems can be overcome by a decorative material which comprises at least a substrate, a low-gloss pattern ink layer partially formed on the substrate, and a surface protective layer which is present on and contacted with the low-gloss pattern ink layer so as to cover a whole surface of the low-gloss pattern ink layer, wherein the surface protective layer is formed by crosslinking and curing an ionizing radiation-curable resin composition, and provided therein with a low-gloss region which is located in a portion just above the low-gloss pattern ink layer and in the vicinity of the portion, and visually recognized as a concave portion. Further, it has also been found that when an ethyleneoxide-modified polymerizable compound is contained in the ionizing radiation-curable resin composition forming the surface protective layer, and baked kaolin particles are contained in the surface protective layer, oils are prevented from penetrating through the surface protective layer owing to reduction in affinity between the surface protective layer and the oils, resulting in improvement in oil resistance as well as enhancement in marring resistance due to the baked kaolin particles contained as a filler in the surface protective layer. The present invention has been accomplished on the basis of the finding.

Thus, the present invention provides:

(1) A decorative material comprising at least a substrate, a low-gloss pattern ink layer partially formed on the substrate, and a surface protective layer which is present on and contacted with the low-gloss pattern ink layer so as to cover a whole surface including both a region where the low-gloss pattern ink layer is formed and a region where no low-gloss pattern ink layer is formed, wherein the surface protective layer is formed by crosslinking and curing an ionizing radiation-curable resin composition containing an ethyleneoxide-modified polymerizable compound, contains baked kaolin particles, and is provided therein with a low-gloss region which is located in a portion just above the low-gloss pattern ink layer and in the vicinity of the portion and visually recognized as a concave portion.

(2) The decorative material as described in the above aspect (1), wherein the ionizing radiation-curable resin composition is an electron beam-curable resin composition.

(3) The decorative material as described in the above aspect (1) or (2), wherein a surface of the surface protective layer located above the low-gloss region has a convex shape.

(4) The decorative material as described in any one of the above aspects (1) to (3), further comprising a penetration-preventing layer formed between the substrate and the low-gloss pattern ink layer.

(5) The decorative material as described in the above aspect (4), wherein the substrate is a penetrable substrate.

(6) The decorative material as described in any one of the above aspects (1) to (5), wherein a colored layer, a pattern layer and the penetration-preventing layer are successively laminated on the substrate, and the low-gloss pattern ink layer as well as the surface protective layer which is present on and contacted with the low-gloss pattern ink layer so as to cover a whole surface including both a region where the low-gloss pattern ink layer is formed and a region where no low-gloss pattern ink layer is formed, are successively formed on the laminated layers.

(7) The decorative material as described in the above aspect (6), wherein a binder of an ink forming the colored layer contains an urethane resin.

(8) The decorative material as described in the above aspect (6) or (7), wherein the pattern layer has a woodgrain pattern, and the low-gloss pattern ink layer forms a low-gloss region corresponding to a vessel portion of the woodgrain pattern.

(9) The decorative material as described in any one of the above aspects (6) to (8), wherein a resin composition forming the penetration-preventing layer contains an urethane resin.

(10) a decorative plate comprising a substrate and the decorative material as described in any one of the above aspects (1) to (9) which is attached onto the substrate.

Effect of the Invention

In accordance with the present invention, it is possible to obtain a decorative material having a pattern on a surface thereof as well as a difference in gloss according to the pattern which can be visually recognized as a concave portion to thereby impart a convexo-concave feeling to the surface thereof, and exhibiting a high solvent resistance, a high abrasion resistance and a high interlaminar strength as well as a less change in appearance even when stained with oils and excellent oil resistance and marring resistance.

PREFERRED EMBODIMENTS FOR CARRYING OUT THE INVENTION

The decorative material of the present invention includes at least a substrate, a low-gloss pattern ink layer partially formed on the substrate, and a surface protective layer which is present on and contacted with the low-gloss pattern ink layer so as to cover a whole surface including both a region where the low-gloss pattern ink layer is formed and a region where no low-gloss pattern ink layer is formed, wherein the surface protective layer is formed by crosslinking and curing an ionizing radiation-curable resin composition containing an ethyleneoxide-modified polymerizable compound, and provided therein with a low-gloss region which is located in a portion just above the low-gloss pattern ink layer and in the vicinity of the portion and visually recognized as a concave portion, and the surface protective layer further contains baked kaolin particles.

Figure 2:
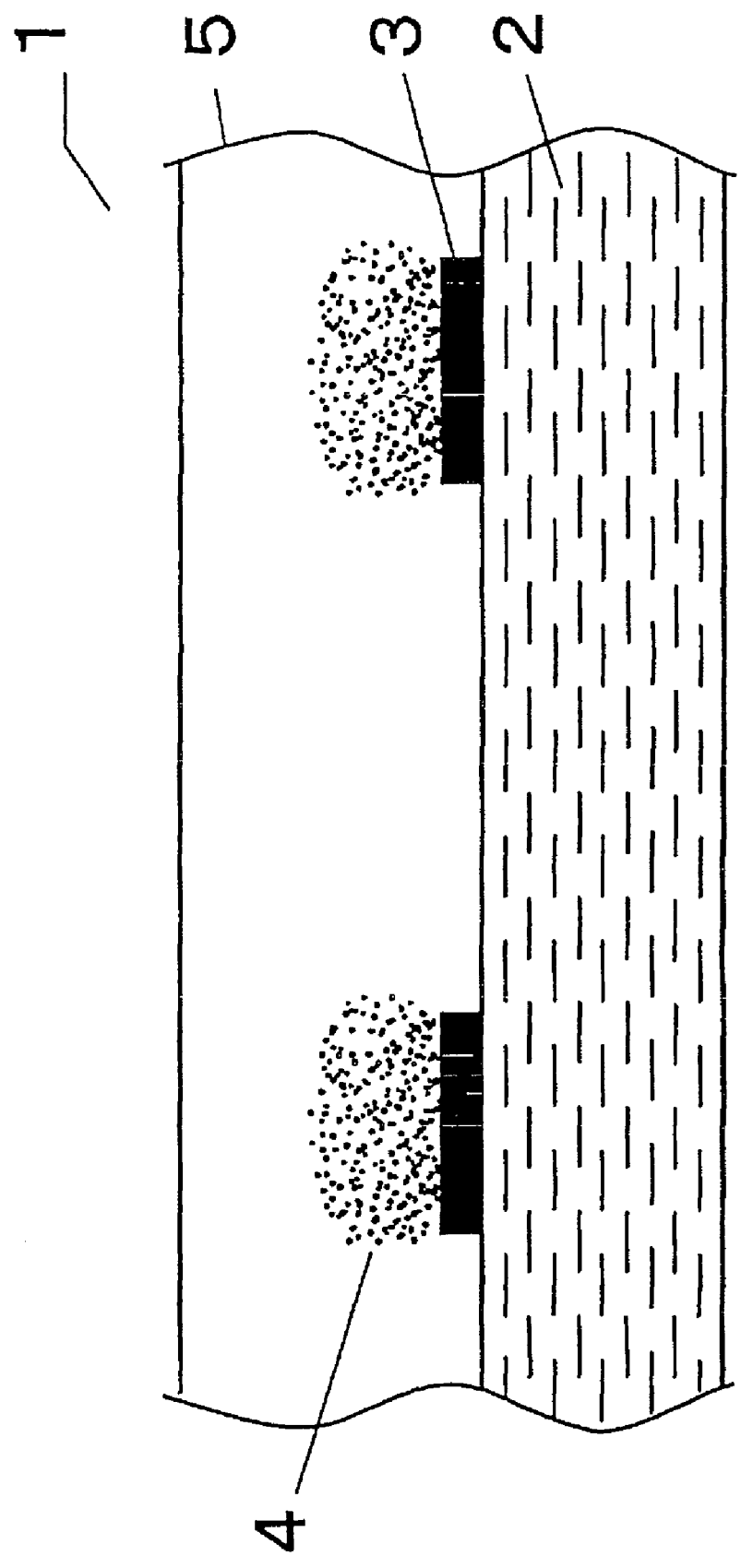
FIG. 2 is a schematic view showing a section of a decorative material according to the present invention.
Figure 3:
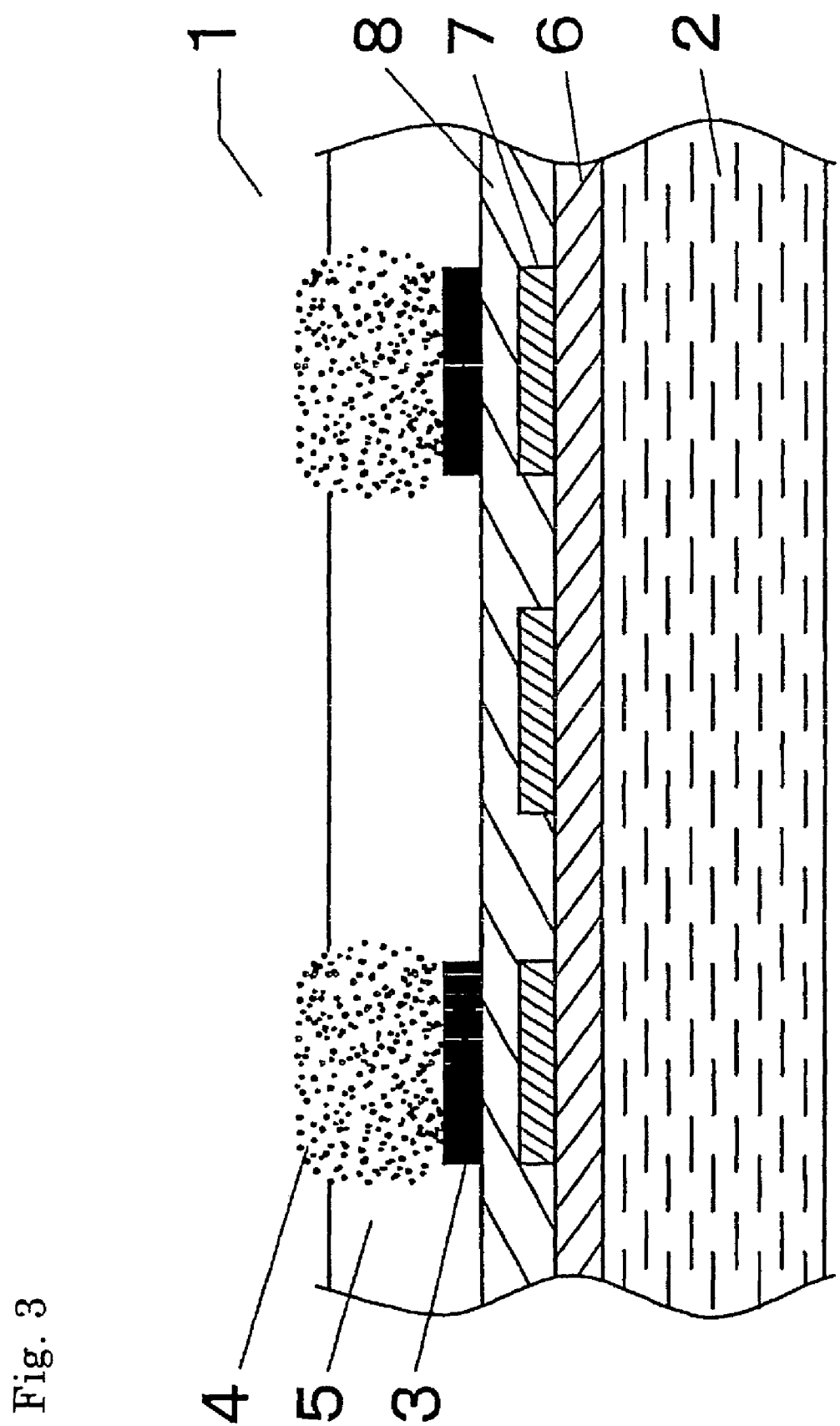
FIG. 3 is a schematic view showing a section of a decorative material according to the present invention.

The typical structure of the decorative material according to the present invention is described in detail by referring to FIGS. 1 to 3. FIGS. 1 to 3 are schematic views showing a decorative material 1 of the present invention. In the embodiment shown in FIG. 1, a colored layer 6 uniformly covering a whole surface of a substrate 2, a pattern layer 7, a uniform penetration-preventing layer 8, a low-gloss pattern ink layer 3 and a surface protective layer 5 which is made of a resin formed by crosslinking and curing an ionizing radiation-curable resin composition containing an ethyleneoxide-modified polymerizable compound and further contains baked kaolin particles, are successively laminated on the substrate 2 in this order. The low-gloss pattern ink layer 3 is partially present, and a portion of the surface protective layer located just above the low-gloss pattern ink layer and in the vicinity thereof is provided with a low-gloss region 4. When the decorative material of the present invention is viewed from the side of the surface protective layer 5, the low-gloss region 4 is visually recognized as a concave portion, so that the surface of the decorative material can be visually recognized as a convexo-concave pattern as a whole due to the provision of the low-gloss region 4.

An outermost surface of the surface protective layer 5 which is located above the low-gloss region 4 may be raised up owing to formation of the low-gloss pattern ink layer 3, and may form a convex shape 9. When such a convex shape is present on the surface of the surface protective layer 5, light scattering occurs thereon, the surface area increases, and an angle of visibility for recognizing the low gloss is also widened, thereby further emphasizing a visual convexo-concave feeling in cooperation with the effect of the low gloss region 4. Meanwhile, the height of the convex shape is not particularly limited as long as the effects of the present invention can be suitably exhibited, and is usually in the range of 2 to 3 μm.

Next, in the embodiment shown in FIG. 2, the low-gloss pattern ink layer 3 is laminated on the substrate 2, and the surface protective layer 5 formed by crosslinking and curing an ionizing radiation-curable resin composition is laminated on the low-gloss pattern ink layer 3. Similarly to the decorative material shown in FIG. 1, a portion of the surface protective layer located just above the low-gloss pattern ink layer or in the vicinity thereof is provided with a low-gloss region 4. When the decorative material of the present invention is viewed from the side of the surface protective layer 5, the low-gloss region 4 partially present thereon is visually recognized as a concave portion, so that a convexo-concave pattern is recognized as a whole on the surface of the decorative material. Meanwhile, in the drawings, the low-gloss region 4 is represented by collection of points.

The extent of spread of the low-gloss region 4 formed in the surface protective layer 5 is not particularly limited as long as the effects of the present invention can be suitably exhibited. As shown in FIGS. 1 and 2, the low-gloss region 4 may extend from the surface of the low-gloss pattern ink layer 3 in the thickness direction of the surface protective layer 5 and terminate at the mid thereof. Alternatively, as shown in FIG. 3, the low-gloss region 4 may reach the outermost surface of the surface protective layer 5. Further, as shown in FIG. 3, the low-gloss region 4 may be raised into a convex shape on the outermost surface of the surface protective layer 5.

Next, a preferred embodiment of the present invention is described in detail by referring to FIG. 1.

The substrate 2 used in the present invention is not particularly limited as long as it is ordinarily usable for decorative materials, and may be appropriately selected from various materials such as papers, plastic films, plastic sheets, metal foils, metal sheets, metal plates, wood plates such as timber, and ceramic-based materials according to the applications thereof. These materials may be used alone or in the form of a laminate composed of an optional combination thereof such as a composite of papers and a composite of a paper and a plastic film.

One or both surfaces of the substrate, in particular, a plastic film substrate or a plastic sheet substrate may be subjected to physical or chemical surface treatments such as those using oxidation method or convex/concave shaping method, if required, in order to enhance adhesion of the substrate to the layer to be laminated thereon.

Examples of the treatments using the oxidation method include a corona discharge treatment, a chromate treatment, a flame treatment, a hot air treatment and an ozone/ultraviolet treatment. Examples of the treatments using the convex/concave shaping method include a sand blast treatment and a solvent treatment. These surface treatments may be appropriately selectively conducted depending upon the kind of substrate used. In general, among these treatments, the corona discharge treatment is preferably used in view of good effects and facilitated operation thereof.

In addition, for the purposes of enhancement of interlaminar bonding strength between the substrate and the respective layers, etc., a primer layer may be formed on the substrate. Further, the substrate may be coated with a suitable paint to adjust a hue thereof, or may be formed thereon with a pattern in view of imparting a good design thereto.

Examples of various papers used as the substrate include thin cut sheet papers, kraft papers and titanium papers. These paper substrates may further contain resins such as acrylic resins, styrene-butadiene rubbers, melamine resins and urethane resins in order to enhance an interlaminar bonding strength between fibers of the paper substrate or between the paper substrate and the other layers or prevent formation of fuzzes (by either impregnation with the resins after papermaking or inclusion of the resins during paper-making). Examples of the resin-containing paper include interlaminar reinforced papers and resin-impregnated papers.

In addition to the above papers, as the substrate, there may be used various papers which are frequently employed in building applications, such as linter papers, paper boards, base papers for gypsum boards and raw fabrics for vinyl-based wall papers which are composed of a paper and a vinyl chloride resin layer formed on a surface of the paper. Further, as the substrate, there may also be used such papers employed in business applications or for ordinary printing and packaging purposes such as coated papers, art papers, parchment papers, glassine papers, paraffin papers and Japanese papers. Although being distinguished from these papers, as the substrate, there may also be used woven fabrics and nonwoven fabrics of various fibers which have an appearance and properties similar to those of papers. Examples of various fibers include inorganic fibers such as glass fibers, asbestos fibers, potassium titanate fibers, alumina fibers, silica fibers and carbon fibers, and synthetic resin fibers such as polyester fibers, acrylic fibers and vinylon fibers.

The plastic film or the plastic sheet may be made of various synthetic resins. Examples of the synthetic resins include polyethylene resins, polypropylene resins, polymethylpentene resins, polyvinyl chloride resins, polyvinylidene chloride resins, polyvinyl alcohol resins, vinyl chloride/vinyl acetate copolymer resins, ethylene/vinyl acetate copolymer resins, ethylene/vinyl alcohol copolymer resins, polyethylene terephthalate resins, polybutylene terephthalate resins, polyethylene naphthalate/isophthalate copolymer resins, polymethyl methacrylate resins, polyethyl methacrylate resins, polybutyl acrylate resins, polyamide resins such as typically nylon 6 and nylon 66, cellulose triacetate resins, cellophane, polystyrene resins, polycarbonate resins, polyallylate resins and polyimide resins.

Examples of the metal foil, metal sheet or metal plate include those made of aluminum, iron, stainless steel and copper, as well as those plated with these metals. Examples of various wood plates include veneer, plywood, laminated wood, particle board, and wood fiber plates such as MDF (medium-density fiber board). Examples of the ceramic materials include ceramic building materials such as gypsum boards, calcium silicate boards and wood chip cement boards; pottery; glass; porcelain enamel; and baked tile. Examples of the other substrate include composites of various materials such as fiber-reinforced plastic (FRP) plates, laminates obtained by attaching an iron plate on both surfaces of a paper honeycomb, and laminates obtained by sandwiching a polyethylene resin sheet between two aluminum plates.

The thickness of the substrate 2 is not particularly limited. The thickness of the plastic sheet substrate is usually from about 20 to about 150 μm and preferably from 30 to 100 m. The basic weight of the paper substrate is usually from about 20 to about 150 g/m$^2$ and preferably from 30 to 100 g/m$^2$.

The colored layer 6 as shown in FIG. 1 which is formed so as to cover a whole surface of the substrate may be optionally provided for enhancing a design property of the decorative material according to the present invention, and may also be referred to as a concealing layer or a whole solid layer. Thus, the colored layer 6 serves for adjusting a color of a surface of the substrate 2, and is formed for coloring the surface of the substrate 2 as intended when the substrate 2 is unsuitably colored by itself or exhibits an uneven color. The colored layer usually has an opaque color in many cases, but may also show a tinted transparent color to utilize an original pattern of the underlying layer. In the case where a white color of the substrate 2 is utilized or the substrate 2 itself is suitably tinted, it is not required to provide the colored layer 6.

The ink used for forming the colored layer may be those produced by appropriately mixing a binder with a colorant such as pigments and dyes, an extender pigment, a solvent, a stabilizer, a plasticizer, a catalyst and a hardening agent. The binder is not particularly limited. Examples of the binder include polyurethane-based resins, vinyl chloride/vinyl acetate-based copolymer resins, vinyl chloride/vinyl acetate/acrylic compound-based copolymer resins, chlorinated polypropylene-based resins, acrylic resins, polyester-based resins, polyamide-based resins, butyral-based resins, polystyrene-based resins, nitrocellulose-based resins and cellulose acetate-based resins. The binder may be optionally selected from these resins, and these resins may be used alone or in the form of a mixture of any two or more thereof.

As the binder of the ink forming the colored layer, in addition to the above resins, there may also be suitably used urethane resins.

The urethane resins may be produced by reacting a polyol such as acrylic polyols, polyester polyols and polyether polyols with an isocyanate, e.g., an aromatic isocyanate such as tolylene diisocyanate, xylylene diisocyanate and diphenyl methane diisocyanate or an aliphatic or alicyclic isocyanate such as isophorone diisocyanate, hexamethylene diisocyanate and hydrogenated tolylene diisocyanate. The number of hydroxyl groups per one molecule of the polyol and the number of isocyanate groups per one molecule of the isocyanate are each 2 as an average value. The average molecular weight of the urethane resin is preferably from about 10,000 to about 50,000, and the glass transition temperature (Tg) of the urethane resin is preferably from about −70° C. to about 60° C., in view of good oil resistance and scratch resistance.

Examples of the colorant used in the colored layer include inorganic pigments such as carbon black (Japanese ink), iron black, titanium white, antimony white, chrome yellow, titanium yellow, iron oxide red, cadmium red, ultramarine blue and cobalt blue; organic pigments and dyes such as quinacridone red, isoindolinone yellow and phthalocyanine blue; metallic pigments made of scale-like foil pieces of aluminum, brass, etc., and nacreous (pearl) pigments made of scale-like foil pieces of titanium dioxide-coated mica, basic lead carbonate, etc.

The thickness of the colored layer 6 is from about 1 to about 20 μm, and a so-called solid printing layer may be suitably used as the colored layer 6.

The pattern layer 7 shown in FIG. 1 serves for imparting a decorative design to the substrate 2, and is formed by printing various patterns with an ink using a printer. Examples of the patterns formed by the pattern layer 7 include woodgrain patterns, stone-grain patterns imitating the surface of rocks such as marble pattern (e.g., travertine marble pattern), cloth patterns imitating texture of cloth and fabric, tiling patterns, brick work patterns, and composite patterns thereof such as parquetry patterns and patchwork patterns. These patterns may be produced by multi-color printing with a process color including yellow, red, blue and black colors, or by multi-color printing with a special color using printing plates corresponding to individual colors of the pattern.

The pattern ink used for forming the pattern layer 7 may be the same as the ink used for forming the colored layer 6. Meanwhile, in the decorative material of the present invention, since the low-gloss pattern ink layer 3 and the low-gloss region 4 as described in detail below are capable of imparting a decorative design thereto, the provision of the pattern layer 7 is not necessarily essential.

The penetration-preventing layer 8 shown in FIG. 1 may be optionally provided, and has a function of inhibiting penetration of a low-gloss pattern ink used for forming the below-mentioned low-gloss pattern ink layer 3 and an ionizing radiation-curable resin for forming the below-mentioned surface protective layer 5 into the substrate 2. In particular, the effect of the penetration-preventing layer 8 becomes more remarkable when the substrate 2 is made of a penetrable material such as papers and nonwoven fabrics. Therefore, the penetration-preventing layer 8 may be formed between the substrate 2 and the low-gloss pattern ink layer 3, for example, between the substrate 2 and the colored layer 6, between the colored layer 6 and the pattern layer 7 or between the pattern layer 7 and the low-gloss pattern ink layer 3 as shown in FIG. 1. As the penetration-preventing layer 8, a uniform layer obtained by crosslinking and curing a curable resin which exhibits a good adhesion to the ionizing radiation-curable resin forming the surface protective layer 5 is usually provided between the pattern layer 7 and the low-gloss pattern ink layer 3 as shown in FIG. 1, thereby not only allowing the surface of the colored layer 6, the pattern layer 7, etc., if formed on the substrate 2, to be smoothened, but also exhibiting the effect of enhancing a bonding strength of these layers to the low-gloss pattern ink layer 3 and the surface protective layer 5. Also, examples of the curable resins suitably used for forming the penetration-preventing layer include those resins used as the binder of the ink forming the above colored layer. Of these resins, preferred are the above urethane resins in view of enhanced scratch resistance.

In the decorative material of the present invention, the low-gloss pattern ink layer 3 may be directly laminated on the substrate 2 as shown in FIG. 2, or may be laminated on the colored layer 6, the pattern layer 7, the penetration-preventing layer 8, etc., which may be optionally provided, as shown in FIG. 1. The low-gloss pattern ink layer 3 serves for generating the difference in gloss of the pattern.

The mechanism of generation of the difference in gloss of the pattern according to the present invention is not clearly determined. However, from the results of various experiments, observations and measurements, it is suggested that by appropriately selecting combination of the respective materials and coating conditions upon application of an uncured ionizing radiation-curable resin for forming the surface protective layer 5 onto the surface of the low-gloss pattern ink layer 3, the resin component of the low-gloss pattern ink layer 3 and the surface protective layer are interacted with each other to cause partial elution, dispersion and mixing therebetween. In such a case, it is considered that the respective resin components of the ink contained in the low-gloss pattern ink layer 3 and the uncured ionizing radiation-curable resin are not completely compatilized with each other for a short period of time, but are kept in a suspended state and located in a portion just above the low-gloss pattern ink layer 3 and in the vicinity of the portion, so that the suspended portion scatters light to form the low-gloss region. When the surface protective layer is crosslinked and cured while maintaining the suspended state, it is suggested that such a suspended state is fixed, so that the low-gloss region 4 is partially formed in the surface protective layer, and recognized as a concave portion due to optical illusion.

The low-gloss pattern ink forming the low-gloss pattern ink layer 3 has a property capable of interacting with the ionizing radiation-curable resin composition for forming the surface protective layer 5 to cause elution, dispersion and mixing therebetween, and therefore may be appropriately selected in view of the relation with the (uncured) ionizing radiation-curable resin composition. More specifically, the low-gloss pattern ink preferably contains a non-crosslinkable resin as a binder resin. Examples of the suitable binder resin of the ink include thermoplastic (non-crosslinkable type) urethane resins. In addition, the binder resin of the low-gloss pattern ink may also contain, if required, unsaturated polyester resins, acrylic resins or vinyl chloride/vinyl acetate copolymers in order to adjust the extent of formation of the low-gloss region and the contrast of difference in gloss between the low-gloss region and surrounding portions thereof.

The low-gloss pattern ink forming the low-gloss pattern ink layer 3 may contain a colorant similarly to those ink compositions used for forming the cored layer 6 and the pattern layer 7 to form a design pattern by itself. However, in the case where the colored layer 6 and the pattern layer 7 are provided as shown in FIG. 1, since the substrate 2 is already imparted with hues and patterns by these layers, the low-gloss pattern ink composition forming the low-gloss pattern ink layer 3 is not necessarily required to contain the colorant for tinting the layer. More specifically, when the pattern layer 7 is provided, the low-gloss pattern ink layer 3 is coordinated with a portion of the pattern expressed by the pattern layer 7 which is to be delustered and visually recognized as a concave portion, thereby obtaining a pattern having the portion visually recognized as a concave portion due to the difference in gloss. For example, if a woodgrain pattern is to be expressed by the pattern layer 7, the ink portion of the low-gloss pattern ink layer 3 is coordinated with a vessel portion of the woodgrain pattern, thereby obtaining such a pattern in which the vessel portion is visually recognized as a concave portion due to the difference in gloss. In addition, when a tiling pattern is to be expressed by the pattern layer 7, the ink portion of the low-gloss pattern ink layer 3 is coordinated with a grooved joint portion of the tiling, thereby obtaining such a pattern in which the grooved joint portion is visually recognized as a concave portion due to the difference in gloss.

In the decorative material of the present invention, the low-gloss pattern ink layer 3 is provided thereon with the surface protective layer 5 which is made of a resin obtained by crosslinking and curing the ionizing radiation-curable resin composition containing the ethyleneoxide-modified polymerizable compound, and contains baked kaolin particles. Owing to an interaction between the low-gloss pattern ink forming the low-gloss pattern ink layer 3 and the ionizing radiation-curable resin composition forming the surface protective layer 5, a low-gloss zone occurs just above the partially existing low-gloss pattern ink layer 3 and in the vicinity thereof, and as a result, the low-gloss region 4 is formed at least partially in the thickness direction of the surface protective layer. When the decorative material 1 is viewed from the side of the surface protective layer 5, the low-gloss region 4 is visually recognized as a concave portion, so that the surface of the decorative material can be visually recognized with a convexo-concave pattern due to the provision of the low-gloss region 4.

The coating amount of the low-gloss pattern ink for forming the low-gloss pattern ink layer 3 is preferably in the range of 2 to 20 g/m$^2$. When the coating amount of the low-gloss pattern ink is 2 g/m$^2$ or more, the above-described interaction between the low-gloss pattern ink and the ionizing radiation-curable resin composition suitably takes place to form a sufficient low-gloss region, thereby producing a sufficient difference in gloss on the surface of the resultant decorative material. On the other hand, when the coating amount of the low-gloss pattern ink is 20 g/m$^2$ or less, the printing with the low-gloss pattern ink can be made without any mechanical limitations, resulting in economical advantage. From these viewpoints, the coating amount of the low-gloss pattern ink is more preferably from 5 to 10 g/m$^2$.

Further, the low-gloss pattern ink composition for forming the low-gloss pattern ink layer 3 preferably contains an extender pigment. The inclusion of the extender pigment allows the low-gloss pattern ink composition to exhibit a thixotropic property. As a result, when printing the low-gloss pattern ink layer 3 using a printing plate, the shape of the low-gloss pattern ink composition applied thereto can be maintained, so that a sharpness of the convexo-concave shape at an end portion at which transition between convex and concave portions occurs, can be emphasized, thereby enabling sharp expression of the design pattern.

The extender pigment used in the present invention is not particularly limited, and may be appropriately selected from silica, talc, clay, barium sulfate, barium carbonate, calcium sulfate, calcium carbonate, magnesium carbonate, etc. Among these extender pigments, preferred is silica because the silica has a high freedom of selection of material as to oil absorption, particle size and pore volume and is excellent in designing property, whiteness and coatability as an ink, and more preferred is a silica powder. The particle size of silica is preferably from 0.1 to 5 μm. The ink containing silica having a particle size of 0.1 μm or larger is prevented from exhibiting an extremely high thixotropic property and a too high viscosity, resulting in facilitated control of printing therewith. Also, when it is intended to express the vessel pattern as a delustered portion, if the particle size of silica is smaller than a thickness of the ink coating layer of the vessel pattern portion which is usually 5 μm or smaller, protrusion of the silica particles on a surface of the ink coating layer is relatively suppressed and the protruded particles are unnoticeable, thereby preventing occurrence of visually strange feeling.

The content of the extender pigment in the low-gloss pattern ink composition is preferably in the range of 5 to 15% by mass. The low-gloss pattern ink composition containing the extender pigment in an amount of 5% by mass or more can exhibit a sufficient thixotropic property, whereas the low-gloss pattern ink composition containing the extender pigment in an amount of 15% by mass or less is completely free from deterioration in the effect of imparting a low gloss.

The surface protective layer 5 is formed by crosslinking and curing the ionizing radiation-curable resin composition containing the ethyleneoxide-modified polymerizable compound, and contains the baked kaolin particles, as described above. The ionizing radiation-curable resin composition used herein means a resin composition having energy quanta capable of crosslinking and polymerizing molecules thereof when exposed to electromagnetic wave or charged particle beam, namely such a resin composition capable of undergoing crosslinking and curing reactions upon irradiating an ultraviolet ray or an electron beam thereto.

The inherent purpose of such a surface protective layer, i.e., the conventional purpose of providing the surface protective layer, is to impart chemical surface properties (such as stain resistance, chemical resistance and cellophane tape resistance) and mechanical properties (such as scratch resistance and abrasion resistance) to the decorative material according to applications thereof. In the present invention, the inclusion of the ethyleneoxide-modified polymerizable compound in the ionizing radiation-curable resin allows the resultant surface protective layer to exhibit an improved oil resistance, and the inclusion of the baked kaolin particles in the surface protective layer allows the layer to exhibit an improved marring resistance. More specifically, as to the oil resistance, when the surface protective layer is formed of the ionizing radiation-curable resin containing the ethyleneoxide-modified polymerizable compound, an affinity of the surface protective layer to oils can be lowered owing to a hydrophilic property of an ethyleneoxide moiety of the compound as compared to the case where no ethyleneoxide-modified polymerizable compound is contained therein. As a result, oils such as edible oils which are attached onto the surface protective layer are prevented from being penetrated into the surface protective layer, thereby allowing the resultant decorative material to be improved in oil resistance by the effect of the surface protective layer itself.

The ethyleneoxide-modified polymerizable compound is such a compound which is capable of undergoing a polymerization reaction when exposed to an ionizing radiation, and contains an ethyleneoxide-modified moiety. The suitable ethyleneoxide-modified polymerizable compound may be appropriately used according to applications of the decorative material. Specific examples of the ethyleneoxide-modified polymerizable compound include trimethylolpropane ethyleneoxide-modified tri(meth)acrylate and bisphenol A ethyleneoxide-modified di(meth)acrylate. Meanwhile, the term "(meth)acrylate" used herein means an acrylate, a methacrylate or both thereof.

With the increase in chain number n (per molecule) of ethyleneoxide repeating units in the ethyleneoxide-modified moiety, the oil resistance of the surface protective layer is increased, but on the contrary, the surface protective layer is deteriorated in water resistance and stain resistance to aqueous contaminants such as water-based inks due to the increased hydrophilicity. Therefore, the chain number n of ethyleneoxide repeating units in the ethyleneoxide-modified moiety may be appropriately adjusted in view of good balance between these properties. For example, the chain number n of ethyleneoxide repeating units in the ethyleneoxide-modified moiety is preferably from 2 to 20 and more preferably from 4 to 15. Meanwhile, the ethyleneoxide-modified polymerizable compound may be a difunctional, trifunctional or other functional, for example, tetra- or higher functional compound. The functionality of the ethyleneoxide-modified polymerizable compound may be appropriately determined according to hardness of the coating film or the like as required for the surface protective layer.

In the ionizing radiation-curable resin used in the surface protective layer, a whole amount of the resin components capable of undergoing a polymerization reaction when exposed to an ionizing radiation may be constituted of the ethyleneoxide-modified polymerizable compound. However, in view of other properties than oil resistance, for example, stain resistance to water-based inks being present on the surface of the surface protective layer, etc., the other ionizing radiation-polymerizable compounds which are also polymerizable when exposed to an ionizing radiation may be appropriately used in combination with the ethyleneoxide-modified polymerizable compound. More specifically, when the ionizing radiation-curable resin is composed of the ethyleneoxide-modified polymerizable compound solely, the surface protective layer is enhanced in oil resistance owing to the increased hydrophilicity, but tends to be deteriorated in stain resistance to aqueous contaminants such as water-based inks owing to increased affinity to aqueous substances. In such a case, a non-hydrophilic polymerizable compound, for example, an ethyleneoxide-unmodified acrylate monomer and/or a prepolymer thereof (ordinary acrylate monomer and/or its prepolymer) may be suitably blended with the ethyleneoxide-modified polymerizable compound. In order to attain both the oil resistance and the stain resistance to aqueous contaminants, the blending ratio (mass ratio) of the ethyleneoxide-modified polymerizable compound to the ethyleneoxide-unmodified polymerizable compound is preferably in the range of from 3/7 to 5/5. Although propyleneoxide belongs to alkyleneoxide compounds similarly to the ethyleneoxide, if the propyleneoxide-modified compound is used in place of the ethyleneoxide-modified compound, the relative ratio of ether bonds contained in the ionizing radiation-curable resin tends to be reduced, and the tendency of increase in hydrophilicity is lowered, thereby failing to obtain a good oil resistance.

As the ionizing radiation-curable resin other than the ethyleneoxide-modified polymerizable compound, there may be appropriately used conventionally known compounds. More specifically, the ionizing radiation-curable resin may be appropriately selected from polymerizable monomers and polymerizable oligomers or prepolymers which are conventionally commonly used as ionizing radiation-curable resin components.

Typical examples of the suitable polymerizable monomers include (meth)acrylate monomers containing a radical-polymerizable unsaturated group in a molecule thereof. Of these (meth)acrylate monomers, preferred are polyfunctional (meth)acrylates. The polyfunctional (meth)acrylates are not particularly limited as long as they have two or more ethylenically unsaturated bonds in a molecule thereof. Specific examples of the polyfunctional (meth)acrylates include ethylene glycol di(meth)acrylate, propylene glycol di(meth)acrylate, 1,4-butanediol di(meth)acrylate, 1,6-hexanediol di(meth)acrylate, neopentyl glycol di(meth)acrylate, polyethylene glycol di(meth)acrylate, neopentyl glycol di(meth)acrylate hydroxypivalate, dicyclopentenyl di(meth)acrylate, caprolactone-modified dicyclopentenyl di(meth)acrylate, ethyleneoxide-modified phosphoric acid di(meth)acrylate, allylated cyclohexyl di(meth)acrylate, isocyanurate di(meth)acrylate, trimethylolpropane tri(meth) acrylate, ethyleneoxide-modified trimethylolpropane tri(meth)acrylate, dipentaerythritol tri(meth)acrylate, propionic acid-modified dipentaerythritol tri(meth)acrylate, pentaerythritol tri(meth)acrylate, propyleneoxide-modified trimethylolpropane tri(meth)acrylate, tris(acryloxyethyl) isocyanurate, propionic acid-modified dipentaerythritol penta(meth)acrylate, dipentaerythritol hexa(meth)acrylate, ethyleneoxide-modified dipentaerythritol hexa(meth)acrylate and caprolactone-modified dipentaerythritol hexa(meth)acrylate. These polyfunctional (meth)acrylates may be used alone or in combination of any two or more thereof.

In the present invention, for the purpose of reducing a viscosity of the polyfunctional (meth)acrylate, a monofunctional (meth)acrylate may be appropriately used in combination with the polyfunctional (meth)acrylate unless the effects of the present invention are adversely affected. Examples of the monofunctional (meth)acrylate include methyl (meth)acrylate, ethyl (meth)acrylate, propyl (meth)acrylate, butyl (meth)acrylate, pentyl (meth)acrylate, hexyl (meth)acrylate, cyclohexyl (meth)acrylate, 2-ethylhexyl (meth)acrylate, lauryl (meth)acrylate, stearyl (meth)acrylate and isobornyl (meth)acrylate. These monofunctional (meth)acrylates may be used alone or in combination of any two or more thereof.

As the polymerizable oligomer, there may be used oligomers having a radical-polymerizable unsaturated group in a molecule thereof. Examples of the polymerizable oligomers include epoxy (meth)acrylate-based oligomers, urethane (meth)acrylate-based oligomers, polyester (meth) acrylate-based oligomers and polyether (meth)acrylate-based oligomers. The epoxy (meth)acrylate-based oligomers may be produced, for example, by esterifying an oxirane ring of a relatively low-molecular weight bisphenol-type epoxy resin or novolak-type epoxy resin with (meth)acrylic acid. In addition, there may also be used carboxyl-modified epoxy (meth)acrylate oligomers obtained by partially modifying the above epoxy (meth)acrylate-based oligomers with a dibasic carboxylic anhydride. The urethane (meth)acrylate-based oligomers may be produced, for example, by esterifying a polyurethane oligomer obtained by reacting a polyether polyol or a polyester polyol with a polyisocyanate, with (meth)acrylic acid. The polyester (meth)acrylate-based oligomers may be produced, for example, by esterifying a hydroxyl group of a polyester oligomer having hydroxyl groups at both terminal ends thereof which is obtained by condensation between a polycarboxylic acid and a polyhydric alcohol, with (meth)acrylic acid, or by esterifying a terminal hydroxyl group of an oligomer obtained by adding an alkyleneoxide to a polycarboxylic acid, with (meth)acrylic acid. The polyether (meth)acrylate-based oligomers may be produced, for example, by esterifying a hydroxyl group of a polyether polyol with (meth)acrylic acid.

Examples of the other polymerizable oligomers include polybutadiene (meth)acrylate-based oligomers having a high hydrophobic property which is in the form of a polybutadiene oligomer having a (meth)acrylate group in a side chain thereof; silicone (meth)acrylate-based oligomers having a polysiloxane bond in a main chain thereof; aminoplast resin (meth)acrylate-based oligomers obtained by modifying an aminoplast resin having a large number of reactive groups in a small molecule thereof; and oligomers having a cation-polymerizable functional group in a molecule thereof such as a novolak-type epoxy resin, a bisphenol-type epoxy resin, an aliphatic vinyl ether and an aromatic vinyl ether.

In the present invention, as described above, it is important that the low-gloss pattern ink for forming the low-gloss pattern ink layer 3 and the ionizing radiation-curable resin composition for forming the surface protective layer 5 are interacted with each other. Therefore, the suitable ink and ionizing radiation-curable resin composition are selected in view of good interaction therebetween. The ionizing radiation-curable resin composition preferably contains a polyfunctional (meth)acrylate monomer.

The baked kaolin particles used for imparting a marring resistance may be those kaolin particles obtained by baking ordinary (hydrous) kaolin particles. When adding the baked kaolin particles as a filler to the surface protective layer, the resultant decorative material can exhibit an improved marring resistance which has not been realized by silica particles or unbaked hydrous kaolin particles. Meanwhile, the particle size of the baked kaolin particles may be appropriately determined according to applications, properties as required, etc. For example, there may be used such baked kaolin particles having an average particle size of about 0.5 to about 2 µm. The amount of the baked kaolin particles added may be appropriately determined according to applications, properties as required, etc. For example, the amount of the baked kaolin particles added is from about 5 to about 50 parts by mass on the basis of 100 parts by mass of the ionizing radiation-curable resin or 100 parts by mass of a sum of the ionizing radiation-curable resin and other resins if the surface protective layer further contains the other resins.

The change in surface gloss which is to be inhibited by the effect of improving the marring resistance usually includes increase in gloss as compared to such a surface gloss which is appropriately controlled to a lower level (also referred to "half gloss") from the viewpoint of a design expression. Upon the increase in gloss, the surface is deteriorated in delustering feel and suffers from much luster. However, the change in surface gloss to be inhibited may also include decrease in gloss.

In addition, the refractive index of the baked kaolin particles is preferably close to that of the resin forming the surface protective layer in view of a good transparency of the surface protective layer, and is usually from 1.6 to 1.7. Meanwhile, the baled kaolin particles are more excellent in coating stability than hydrous kaolin particles.

The baked kaolin particles used in the present invention may be further subjected to surface treatments. When using the surface-treated baked kaolin particles, the obtained decorative material can be further enhanced in marring resistance. The surface treatments may include those treatments with a silane coupling agent. Examples of the silane coupling agent include known silane coupling agents containing an alkoxy group, an amino group, a vinyl group, an epoxy group, a mercapto group, a chloro group, etc. Specific examples of the silane coupling agent include γ-aminopropyl triethoxysilane, γ-methacryloxypropyl trimethoxysilane, γ-methacryloxypropyl methyl dimethoxysilane, γ-methacryloxypropyl dimethyl methoxysilane, γ-methacryloxypropyl triethoxysilane, γ-methacryloxypropyl dimethyl ethoxysilane, γ-acryloxypropyl trimethoxysilane, γ-acryloxypropyl methyl dimethoxysilane, γ-acryloxypropyl dimethyl methoxysilane, γ-acryloxypropyl triethoxysilane, γ-acryloxypropyl methyl diethoxysilane, γ-acryloxypropyl dimethyl ethoxysilane, vinyl triethoxysilane, γ-glycidoxypropyl trimethoxysilane and γ-mercaptopropyl trimethoxysilane.

When an ultraviolet-curable resin composition is used as the ionizing radiation-curable resin composition, a photopolymerization initiator is preferably added thereto in an amount of about 0.1 to 5 parts by mass on the basis of 100 parts by mass of the resin composition. The photopolymerization initiator may be appropriately selected from conventionally used ones without particular limitations. Examples of the photopolymerization initiator used for polymerizable monomers or polymerizable oligomers containing a radical-polymerizable unsaturated bond in a molecule thereof include benzoin, benzoin methyl ether, benzoin ethyl ether, benzoin isopropyl ether, benzoin n-butyl ether, benzoin isobutyl ether, acetophenone, dimethylaminoacetophenone, 2,2-dimethoxy-2-phenyl acetophenone, 2,2-diethoxy-2-phenyl acetophenone, 2-hydroxy-2-methyl-1-phenylpropan-1-one, 1-hydroxycyclohexyl phenyl ketone, 2-methyl-1-[4-(methylthio)phenyl]-2-morpholino-propan-1-one, 4-(2-hydroxyethoxy)phenyl-2-(hydroxy-2-propyl)ketone, benzophenone, p-phenyl benzophenone, 4,4'-diethylaminobenzophenone, dichlorobenzophenone, 2-methyl anthraquinone, 2-ethyl anthraquinone, 2-tert-butyl anthraquinone, 2-aminoanthraquinone, 2-methyl thioxanthone, 2-ethyl thioxanthone, 2-chlorothioxanthone, 2,4-dimethyl thioxanthone, 2,4-diethyl thioxanthone, benzyl dimethyl ketal and acetophenone dimethyl ketal.

Examples of the photopolymerization initiator used for polymerizable oligomers containing a cation-polymerizable functional group in a molecule thereof, etc., include aromatic sulfonium salts, aromatic diazonium salts, aromatic iodonium salts, metallocene compounds, and benzoin sulfonic esters.

Also, examples of a photosensitizer usable in the ionizing radiation-curable resin composition include p-dimethyl benzoate, tertiary amines and thiol-based sensitizers.

In the present invention, an electron beam-curable resin composition is preferably used as the ionizing radiation-curable resin composition. The electron beam-curable resin composition can be used under a solvent-free condition and is therefore favorable in view of environmental protection and human health, and further can exhibit a stable curing property without requiring any photopolymerization initiator.

The ionizing radiation-curable resin composition used in the present invention may also contain various additives according to required properties of the obtained cured resin layer. Examples of the additives include weather resistance-improving agents, abrasion resistance-improving agents, polymerization inhibitors, crosslinking agents, infrared-absorbing agents, antistatic agents, adhesion-improving agents, leveling agents, thixotropic agents, coupling agents, plasticizers, antifoaming agents, fillers, solvents and colorants.

As the weather resistance-improving agents, there may be used ultraviolet-absorbing agents or light stabilizers. The ultraviolet absorbing agents may be either inorganic or organic compounds. As the preferred inorganic ultraviolet absorbing agents, there may be used particles of titanium oxide, cerium oxide or zinc oxide which have an average particle size of about 5 to 120 nm. As the organic weather resistance-improving agents, there may be used benzotriazole-based compounds. Specific examples of the benzotriazole-based compounds include 2-(2-hydroxy-5-methylphenyl)benzotriazole, 2-(2-hydroxy-3,5-di-tert-aminophenyl) benzotriazole and 3-[3-(benzotriazol-2-yl)-5-tert-butyl-4-hydroxyphenyl]propionic ester of polyethylene glycol. Also, examples of the light stabilizer include hindered amine-based compounds. Specific examples of the light stabilizer include bis(1,2,2,6,6-pentamethyl-4-piperizyl) 2-(3,5-di-tert-butyl-4-hydroxybenzyl)-2'-n-butyl malonate, bis(1,2,2,6,6-pentamethyl-4-piperidyl) sebacate and tetrakis(2,2,6,6-tetramethyl-4-piperidyl)-1,2,3,4-butanetetracarboxylate. In addition, as the ultraviolet absorbing agent or the light stabilizer, there may also be used reactive ultraviolet absorbing agents or light stabilizers having a polymerizable group such as a (meth)acryloyl group in a molecule thereof.

Examples of the inorganic abrasion resistance-improving agent include spherical particles of α-alumina, silica, kaolinite, iron oxide, diamond and silicon carbide. The shape of the inorganic abrasion resistance-improving agent may be a spherical shape, an ellipsoidal shape, a polyhedral shape or a scale-like shape. Among these shapes, preferred is the spherical shape although not particularly limited thereto. Examples of the organic abrasion resistance-improving agent include beads of synthetic resins such as crosslinked acrylic resins and polycarbonate resins. The particle size of the abrasion resistance-improving agent may be usually from about 30 to about 200% of a thickness of the cure resin layer. Among these abrasion resistance-improving agents, spherical α-alumina particles are especially preferred because of high hardness, large effect of improving the abrasion resistance and relatively easy production of the spherical particles.

Examples of the polymerization inhibitor include hydroquinone, p-benzoquinone, hydroquinone monomethyl ether, pyrogallol and t-butyl catechol. Examples of the crosslinking agent used in the present invention include polyisocyanate compounds, epoxy compounds, metal chelate compounds, aziridine compounds and oxazoline compounds.

Examples of the filler include barium sulfate, talc, clay, calcium carbonate and aluminum hydroxide.

Examples of the colorant include known coloring pigments such as quinacridon red, isoindolinone yellow, phthalocyanine blue, phthalocyanine green, titanium oxide and carbon black.

Examples of the infrared-absorbing agent include dithiol-based metal complexes, phthalocyanine-based compounds and diimmonium compounds.

In the present invention, the above polymerizable monomers or polymerizable oligomers as the ionizing radiation-curable component and various additives are intimately mixed with each other at a given mixing ratio to prepare a coating solution composed of the ionizing radiation-curable resin composition. The viscosity of the coating solution is not particularly limited, and may be determined so as to form an uncured resin layer on a surface of the substrate by the below-mentioned coating method.

In the present invention, the thus prepared coating solution is applied onto a surface of the substrate in an amount capable of providing a cured coating layer having a thickness of 1 to 20 μm, by known methods such as gravure coating, bar coating, roll coating, reverse roll coating and Komma coating, preferably gravure coating, thereby forming an uncured resin layer thereon. The cured coating layer having a thickness of 1 μm or larger can exhibit good functions as required. The thickness of the cured surface protective layer is preferably from about 2 to about 20 μm.

In the present invention, the thus formed uncured resin layer is irradiated with an ionizing radiation such as an electron beam and an ultraviolet ray to cure the uncured resin layer. When electron beam is used as the ionizing radiation, an acceleration voltage for the electron beam may be appropriately determined according to the kind of resin used and the thickness of the resin layer, and the uncured resin layer is preferably cured by applying an acceleration voltage of usually about 70 to 300 kV to the electron beam.

Meanwhile, upon irradiation of the electron beam, the higher the acceleration voltage becomes, the higher the penetrability of the electron beam can be attained. Therefore, when using a substrate which tends to be deteriorated by exposure to the electron beam, the acceleration voltage may be controlled such that the depth of penetration of the electron beam is substantially identical to the thickness of the resin layer, thereby inhibiting an excessive amount of the electron beam from being irradiated to the substrate and minimizing deterioration of the substrate by irradiation with an excessive amount of the electron beam.

The exposure dose of the electron beam is preferably such an amount capable of saturating a crosslinking density of the resin layer, and may be selected from the range of usually 5 to 300 kGy (0.5 to 30 Mrad) and preferably 10 to 50 kGy (1 to 5 Mrad).

The electron beam source is not particularly limited, and examples of the electron beam source usable in the present invention include various electron beam accelerators such as Cockroft-Walton type, van de Graaff type, resonance transformer type, insulating core transformer type, linear type, Dynamitron type and high-frequency type.

When an ultraviolet ray is used as the ionizing radiation, the ultraviolet ray to be irradiated may have a wavelength of 190 to 380 nm. The ultraviolet ray source is not particularly limited, and examples of the ultraviolet ray source usable in the present invention include a high-pressure mercury lamp, a low-pressure mercury lamp, a metal halide lamp and a carbon arc lamp.

The thus formed cured resin layer may also contain various additives to impart various functions or performances thereto. Examples of the various functions include those capable of attaining a high hardness and a good marring resistance such as functions of so-called hard coat, anti-fogging coat, anti-fouling coat, anti-glare coat, anti-reflecting coat, ultraviolet-shielding coat and infrared-shielding coat.

Figure 4:
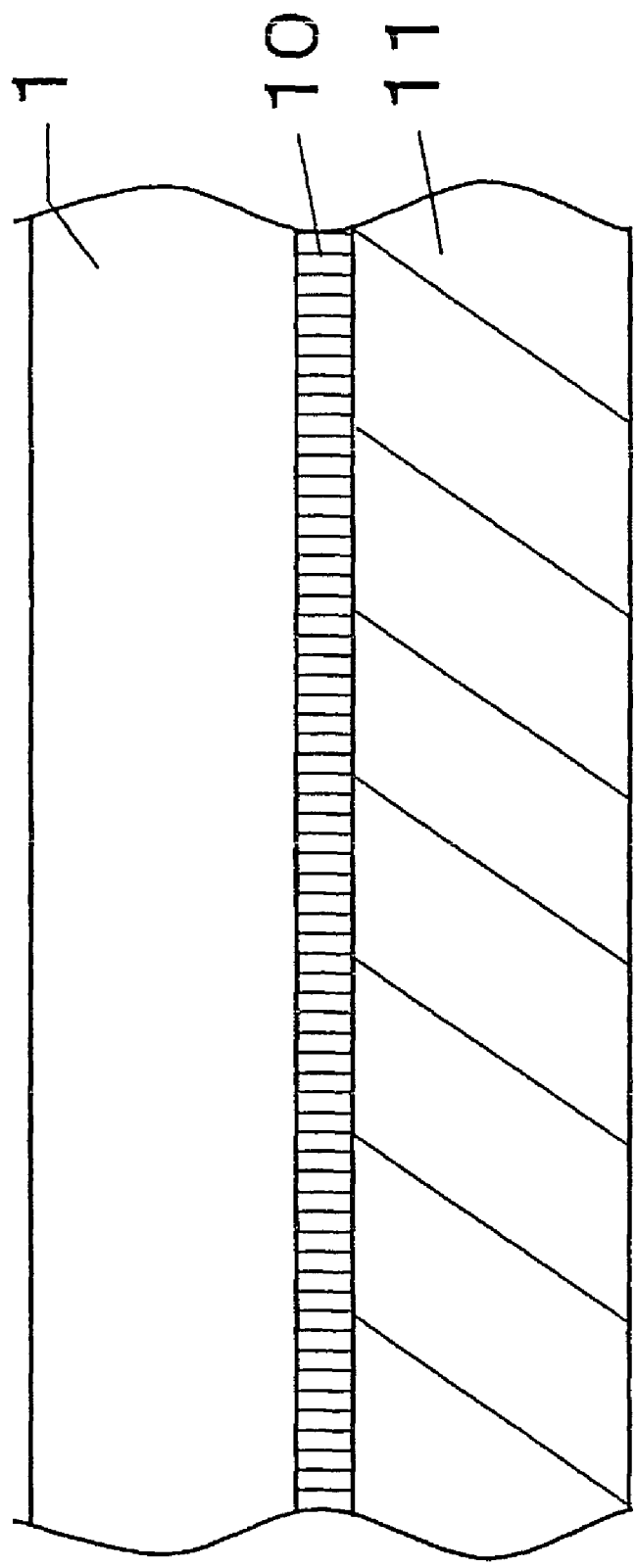
FIG. 4 is a schematic view showing a section of a decorative material according to the present invention.

The decorative material of the present invention can be used as a decorative plate by attaching to various supports. More specifically, as shown in FIG. 4, a decorative material 1 is attached onto a support 11 through an adhesive layer 10.

The support as an adherend is not particularly limited, and may be appropriately selected from plastic sheets, metal plates, wood plates such as timber, and ceramic materials according to the applications. One or both surfaces of these supports, in particular, plastic sheet supports, may be optionally subjected to various physical and chemical surface treatments such as those treatments using oxidation method and convex/concave-shaping method in order to enhance adhesion of the support to the decorative material.

Examples of the treatments using the oxidation method include corona discharge treatment, chromate treatment, flame treatment, hot air treatment and ozone/ultraviolet treatment. Examples of the convex/concave-shaping method include a sandblast method and a solvent-treating method. The surface treatment to be conducted may be appropriately selected according to the kind of support used, and in general, the corona discharge treatment is preferably used because of good effects and facilitated operation thereof.

The plastic sheets may be made of various synthetic resins. Examples of the synthetic resins include polyethylene resins, polypropylene resins, polymethylpentene resins, polyvinyl chloride resins, polyvinylidene chloride resins, polyvinyl alcohol resins, vinyl chloride/vinyl acetate copolymer resins, ethylene/vinyl acetate copolymer resins, ethylene/vinyl alcohol copolymer resins, polyethylene terephthalate resins, polybutylene terephthalate resins, polyethylene naphthalate/isophthalate copolymer resins, polymethyl methacrylate resins, polyethyl methacrylate resins, polybutyl acrylate resins, polyamide resins such as typically nylon 6 and nylon 66, cellulose triacetate resins, cellophane, polystyrene resins, polycarbonate resins, polyallylate resins and polyimide resins.

Examples of the metal plates include those plates made of aluminum, iron, stainless steel, copper, etc. In addition, there may also be used those supports which are plated with these metals.

Examples of the wood plates include sliced veneers, veneers, plywood, particle boards and medium-density fiber (MDF) boards which are made of various materials such as Japanese cryptmeria, hinoki cypress, keyaki, pine, lauan, teak and Melapi. These wood plates may be used alone or in the form of a laminate of any two or more thereof. Meanwhile, the wood plates used herein involve not only plates made of wooden materials, but also plastic plates containing paper powder and reinforced high-strength papers.

Examples of the ceramic materials include ceramic-based building materials such as gypsum boards, calcium silicate boards and wood chip cement boards, pottery, glass, porcelain enamels, baked tiles and boards made of volcanic ash as a main raw material.

In addition to the above illustrated supports, there may also be used composite plates of various materials such as a fiber-reinforced plastic (FRP) plate, a plate produced by attaching an iron plate onto both surfaces of a paper honeycomb and a polyethylene resin plate sandwiched between two aluminum plates.

The support may be subjected to further treatments for forming a primer layer thereon, adjusting a hue thereof by painting, or previously providing a designed pattern thereon. The support as an adherend may be a plate material such as a flat plate or a curved plate made of various materials, or a three-dimensional product (molded article) in which the materials are used singly or in the form of a composite thereof.

The substrate may be attached with a backing or lining material such as Japanese papers, machine-made papers, synthetic papers, nonwoven fabrics, woven fabrics, cheese cloths, impregnated papers and synthetic resin sheets. By using such a substrate to which the backing or lining material is attached, the decorative material can be reinforced by itself, and can be effectively prevented from suffering from occurrence of cracks or rupture and bleeding of adhesives onto a surface thereof, resulting in reduction of defectives and facilitated handling procedure as well as increased yield.

The support on which the decorative material in the form of a cut sheet or a continuous sheet is placed through an adhesive is then pressed or compressed using a laminating apparatus such as a cold press, a hot press, a roll press, a laminator, a lapping machine, a edge-bonding machine and a vacuum press to allow the decorative material to adhere to a surface of the support, thereby producing a decorative plate.

The adhesive may be applied using a coating apparatus such as a spray coater, a spreader and a bar coater. Examples of the adhesive include vinyl acetate resin-based adhesives, urea resin-based adhesives, melamine resin-based adhesives, phenol resin-based adhesives and isocyanate-based adhesives. These adhesives may be used alone or in the form of a mixed adhesive obtained by mixing any two or more thereof with each other at an optional mixing ratio. The adhesive may contain, if required, inorganic powder such as talc, calcium carbonate, clay and titanium white, wheat flour, wood chips, plastic chips, colorants, insecticides, mildew-proof agents, etc. In general, the adhesive has a solid content of 35 to 80% by mass, and is applied onto the surface of the support in an amount of 50 to 300 g/m$^2$.

The decorative material may be usually attached onto the support by forming an adhesive layer on a back surface of the decorative material of the present invention and then bonding the support onto the adhesive layer, or by applying an adhesive onto the support and then bonding the decorative material onto the support through the adhesive.

The thus produced decorative plate may be cut into an optional size, and then the surface or butt end portion thereof may be subjected to optional decorating processes such as grooving and chamfering by means of a cutting machine such as a router and a cutter. The resultant decorative plate may be used in various applications, e.g., interior or exterior materials for buildings such as walls, ceilings and floors; surface decorative plates for fittings such as window frames, doors, balustrades, baseboards, verandahs and malls as well as for kitchen wares, furniture, cabinets of light-electrical appliances or OA devices, interior and exterior equipments for vehicles, etc.

EXAMPLES

The present invention will be described in more detail by referring to the following examples. However, it should be noted that these examples are only illustrative and not intended to limit the invention thereto.

(Evaluation Methods)

The decorative materials obtained in the respective Examples were evaluated by the following methods.

(1) Evaluation of Gloss

The gloss values of a high-gloss region and a low-gloss region were measured at an incident angle of 75° using a gloss meter "GMX-203" available from Murakami Color Research Laboratory. The higher value indicates a higher gloss (higher luster), and the lower value indicates a lower gloss (lower luster).

(2) Water Resistance

A cup filled with water was fixedly placed in an upside-down state on a surface of the decorative material, allowed to stand under the same condition for 24 h, and then removed from the decorative material. Thereafter, the decorative material was allowed to stand at room temperature for 24 h, and then the surface thereof was observed by naked eyes to determine whether any change such as swelling occurred or not. The results are evaluated according to the following criteria:

A: No change occurred

B: Slight change occurred, but within practically acceptable level

C: Severe change such as swelling occurred (3) Oil Resistance

According to JIS K-5400, contaminants (salad oil) were applied onto a surface of the decorative material, and then wiped off. The surface of the decorative material was observed by naked eyes to determine whether any contaminants remained thereon or not. The results were evaluated according to the following criteria:

A: No contaminants remained

B: Slight contaminants remained, but within practically acceptable level

C: Considerable amount of contaminants remained (4) Releasability with Passage of Time A cellophane tape (cellophane adhesive tape "CELLO-TAPE" (registered trademark) available from Nichiban Co., Ltd.; width: 2.5 mm) was attached onto a surface of the decorative material, allowed stand at room temperature (25°) and 50° C. for 24 h, and then forcibly peeled off. The surface portion of the decorative material from which the cellophane tape was released, was observed by naked eyes, and evaluated according to the following criteria:

A: No peeling-off of the pattern occurred at any temperature

B: Slight peeling-off of the pattern occurred, but within practically acceptable level C: Severe peeling-off of the pattern occurred (5) Stain Resistance According to JIS K-6902, contaminants were applied onto a surface of the decorative material, and then wiped off. The surface of the decorative material was observed by naked eyes to determine whether any contaminants remained thereon or not. The results were evaluated according to the following criteria:

A: No contaminants remained

B: Slight contaminants remained, but within practically acceptable level

C: Considerable amount of contaminants remained (6) Marring Performance

Steel wool (#0000) was fitted to a weight adjusted to 29.4 kPa (300 g/cm$^2$), and the surface of the decorative material was rubbed with the steel wool 50 times. The rubbed surface portion of the decorative material was observed by naked eyes to determine the change in gloss, and the results were evaluated according to the following criteria:

A: No change in gloss occurred

B: Slight change in gloss occurred, but within practically acceptable level

C: Severe change in gloss occurred (7) Scratch Resistance

The scratch resistance was evaluated by a scratch resistance test using a Hofmann scratch tester available from BYK Gardner Inc. The decorative material after the scratch resistance test under a load of 200 g was observed by naked eyes, and the results of the observation were evaluated according to the following criteria:

A: No removal of patterns occurred
B: Slight removal of patterns occurred, but within practically acceptable level
C: Remarkable removal of patterns occurred

Example 1

Using an interlaminar-reinforced paper for building materials having a basis weight of 30 g/m² as the substrate 2, a (whole solid printing) layer having a coating amount of 5 g/m² was formed on one surface of the substrate with an ink containing a binder composed of an acrylic resin and nitrocellulose and a colorant composed of titanium white, iron oxide red and chrome yellow by a gravure printing method, thereby forming a colored layer 6. A pattern layer 7 with a woodgrain pattern was formed on the colored layer 6 by a gravure printing method using an ink containing a binder composed of nitrocellulose and a colorant composed mainly of iron oxide red.

Next, a coating composition containing a binder composed of a polyester urethane-based resin having a number-average molecular weight of 20,000 and a glass transition temperature (Tg) of −59.8° C. and a polyisocyanate obtained from tolylene diisocyanate, was applied in a coating amount of 7 g/m² over a whole surface of the substrate by a gravure printing method, thereby forming a penetration-preventing layer 8 (primer layer).

Next, using an ink composition prepared by blending 100 parts by mass of a transparent ink containing a polyester urethane-based resin having a number-average molecular weight of 30,000 and a glass transition temperature (Tg) of −62.8° C. as a binder with 10 parts by mass of silica particles having an average particle size of 1.5 μm, an ink pattern was printed by a gravure printing method so as to coordinate in position with a vessel portion of the woodgrain pattern of the pattern layer 7, thereby forming a low-gloss pattern ink layer 3.

Then, an electron beam-curable resin composition composed of 60 parts by mass of ethyleneoxide-modified trimethylolpropane ethyleneoxide triacrylate as a trifunctional acrylate monomer, 40 parts by mass of dipentaerythritol hexaacrylate as a hexafunctional acrylate monomer, 2 parts by mass of silica particles having an average particle size of 5 μm, 1 part by mass of a silicone acrylate prepolymer and 10 parts by mass of baked kaolin (average particle size: 1.5 μm) was applied in a coating amount of 5 g/m² over these ink layers by a gravure offset coater method. After coating, an electron beam was irradiated to the thus applied electron beam-curable resin composition at an acceleration voltage of 175 kV and an exposure dose of 5 kGy (5 Mrad) to cure the composition, thereby forming a surface protective layer 5. Then, the resultant laminate was cured at 70° C. for 24 h, thereby obtaining a decorative material.

The thus obtained decorative material was examined to evaluate gloss, water resistance, releasability with passage of time, stain resistance and marring performance thereof. The results are shown in Table 1.

Example 2

The same procedure as in Example 1 was repeated except for using a blackish brown ink containing a binder resin obtained by mixing 90% by mass of a polyester urethane-based resin with 10% by mass of an unsaturated polyester resin, and a colorant composed of carbon black and iron oxide red, as the low-gloss pattern ink, thereby obtaining a decorative material.

The thus obtained decorative material was examined to evaluate gloss, water resistance, releasability with passage of time, stain resistance and marring performance thereof. The results are shown in Table 1.

Example 3

Using an interlaminar-reinforced paper for building materials having a basis weight of 30 g/m² as the substrate 2, a (whole solid printing) layer having a coating amount of 10 g/m² was formed on one surface of the substrate with an ink prepared by adding a polyisocyanate composed of a polyresin isocyanate to a colorant obtained by adding titanium white, iron oxide red and chrome yellow to a binder composed of an acrylic polyol having a number-average molecular weight of 50,000 and a glass transition temperature (Tg) of 55° C., by a gravure printing method, thereby forming a colored layer 6. A pattern layer 7 with a woodgrain pattern was formed on the colored layer 6 by a gravure printing method using an ink containing a binder composed of an acrylic polyol having a number-average molecular weight of 27,000 and a glass transition temperature (Tg) of 55° C., and a colorant composed mainly of iron oxide red.

Next, an ink composition prepared by adding a polyisocyanate composed of a polyresin isocyanate to an ink obtained by blending 100 parts by mass of a transparent ink containing an acrylic polyol having a number-average molecular weight of 20,000 and a glass transition temperature (Tg) of 50° C. as a binder with 9.5 parts by mass of silica particles having an average particle size of 1.3 μm, was applied in a coating amount of 12 g/m² over a whole surface of the substrate by a gravure printing method, thereby forming a penetration-preventing layer 8 (primer layer). Next, the same procedure as in Example 1 was repeated to successively form a low-gloss pattern ink layer 3 and a surface protective layer 5, thereby obtaining a decorative material having the same surface conditions as that obtained in Example 1.

The thus obtained decorative material was examined to evaluate gloss, water resistance, releasability with passage of time, stain resistance and marring performance thereof. The results are shown in Table 1.

Example 4

A lauan plywood 10 as a support having a thickness of 2.5 mm was bonded onto a back surface of the decorative material obtained in Example 1 through an adhesive layer formed by applying onto the plywood, an ethylene/vinyl acetate-based adhesive "BA-820" as a water-based emulsion available from Chuorika Co., Ltd., in a coating amount of 60 g/m² (wet), thereby producing a wooden decorative plate.

The respective decorative materials obtained in Examples 1 to 3 were observed by magnifying a section thereof using a microscope. As a result, it was confirmed that a portion of the surface protective layer located just above the low-gloss pattern ink layer and in the vicinity thereof was kept in a low-gloss state exhibiting light scattering, whereas the other surface portion of the surface protective layer exhibited no light scattering and was kept in a highly-transparent state. Further, when the decorative materials were observed by naked eyes from the side of the surface protective layer, the low-gloss pattern ink layer was recognized as a concave portion. Also, it was confirmed that the thus obtained decorative material exhibited good properties, in particular, a high marring performance.

TABLE 1

|  |  | Examples | | |
| --- | --- | --- | --- | --- |
|  |  | 1 | 2 | 3 |
| Gloss: | High-gloss region | 40 | 40 | 40 |
|  | Low-gloss region | 10 | 10 | 10 |
| Water resistance | | B | B | A |
| Oil resistance | | B | B | A |
| Stain resistance | | A | A | A |
| Releasability with time | | A | A | A |
| Marring performance | | A | A | A |
| Stain resistance | | B | B | A |

INDUSTRIAL APPLICABILITY

In accordance with the present invention, it is possible to obtain a decorative material having a pattern on a surface thereof as well as a difference in gloss according to the pattern which can be visually recognized as a concave portion to thereby impart a convexo-concave feeling to the surface thereof, and exhibiting a high solvent resistance, a high abrasion resistance and a high interlaminar strength as well as a less change in appearance even when stained with oils, i.e., a good oil resistance, and a good marring resistance. In particular, when a woodgrain pattern is formed on the decorative material, the difference in gloss and convexo-concave feeling of a vessel portion of the woodgrain pattern can be expressed with reality, so that the same texture as that of actual wood material can be obtained.

The invention claimed is:

1. A decorative material comprising at least a substrate, a low-gloss pattern ink layer formed on part of the substrate, and a surface protective layer which is present on and contacted with the low-gloss pattern ink layer so as to cover a whole surface including both a region where the low-gloss pattern ink layer is formed and a region where no low-gloss pattern ink layer is formed, wherein the surface protective layer is formed by crosslinking and curing an ionizing radiation-curable resin composition containing an ethyleneoxide-modified polymerizable compound, contains baked kaolin particles, and is provided therein with a low-gloss region which is located in a portion just above the low-gloss pattern ink layer and in the vicinity of the portion just above the low-gloss pattern ink layer, and visually recognized as a concave portion, wherein the baked kaolin particles are contained only in the surface protective layer, wherein a low-gloss pattern ink forming the low-gloss pattern ink layer contains a non-crosslinked urethane resin, wherein the ethyleneoxide-modified polymerizable compound has a chain number, n, per molecule, of ethyleneoxide repeating units in the ethyleneoxide-modified moiety thereof that is in a range of 2 to 20, and wherein said low-gloss region is a region in which, prior to curing the ionizing radiation-curable resin composition of the surface protective layer, resin components of ink contained in the low-gloss pattern ink layer and uncured radiation-curable resin of the ionizing radiation-curable resin composition are mixed but not completely compatibilized with each other and are kept in a suspended state, which mixture is fixed upon crosslinking and curing the surface protective layer, whereby in the low-gloss region the low-gloss pattern ink and the resin composition of the surface protective layer have interacted with each other to provide partial elution, dispersion and mixing therebetween, so as to be in the suspended state which is fixed in the low-gloss region.

2. The decorative material according to claim 1, wherein the ionizing radiation-curable resin composition is an electron beam-curable resin composition.

3. The decorative material according to claim 1, wherein a surface of the surface protective layer located above the low-gloss region has a convex shape.

4. The decorative material according to claim 1, further comprising a penetration-preventing layer formed between the substrate and the low-gloss pattern ink layer.

5. The decorative material according to claim 4, wherein the substrate is a penetrable substrate.

6. The decorative material according to claim 1, wherein a colored layer, a pattern layer and a penetration-preventing layer are successively laminated on the substrate, thereby forming laminated layers, and the low-gloss pattern ink layer as well as the surface protective layer which is present on and contacted with the low-gloss pattern ink layer so as to cover a whole surface including both a region where the low-gloss pattern ink layer is formed and a region where no low-gloss pattern ink layer is formed, are successively formed on the laminated layers.

7. The decorative material according to claim 6, wherein a binder of an ink forming the colored layer contains an urethane resin.

8. The decorative material according to claim 6, wherein the pattern layer has a woodgrain pattern, and the low-gloss pattern ink layer forms a low-gloss region corresponding to a vessel portion of the woodgrain pattern.

9. The decorative material according to claim 6, wherein a resin composition forming the penetration-preventing layer contains an urethane resin.

10. A decorative plate comprising a support and the decorative material as defined in claim 1 which is attached onto the support.

11. The decorative material according to claim 4, wherein a colored layer, a pattern layer and the penetration-preventing layer are successively laminated on the substrate, thereby forming laminated layers, and the low-gloss pattern ink layer as well as the surface protective layer which is present on and contacted with the low-gloss pattern ink layer so as to cover a whole surface including both a region where the low-gloss pattern ink layer is formed and a region where no low-gloss pattern ink layer is formed, are successively formed on the laminated layers.

12. A decorative plate comprising a support and the decorative material as defined in claim 6 which is attached onto the support.

13. A decorative plate comprising a support and the decorative material as defined in claim 4 which is attached onto the support.

14. The decorative material according to claim 1, wherein a penetration-preventing layer is provided between the substrate and the low-gloss pattern ink layer, and the low-gloss pattern ink layer and the surface protective layer are provided on the penetration-preventing layer.

15. The decorative material according to claim 1, wherein the number of ethyleneoxide repeating units in the ethyleneoxide-modified moiety is in a range of 4 to 15.

* * * * *